(12) United States Patent
Hill et al.

(10) Patent No.: US 7,561,393 B2
(45) Date of Patent: Jul. 14, 2009

(54) CIRCUIT PROTECTION SYSTEM

(75) Inventors: John Charles Hill, Georgetown, MA (US); Marcelo Esteban Valdes, Burlington, CT (US); Ajit Wasant Kane, Bangalore (IN)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 11/646,623

(22) Filed: Dec. 28, 2006

(65) Prior Publication Data

US 2008/0158751 A1    Jul. 3, 2008

(51) Int. Cl.
*H02H 3/00* (2006.01)
(52) U.S. Cl. .......................................... 361/64; 361/62
(58) Field of Classification Search ............... 361/62–69
See application file for complete search history.

(56) References Cited

U.S. PATENT DOCUMENTS

| | | | |
|---|---|---|---|
| 5,905,616 A * | 5/1999 | Lyke | 361/64 |
| 2004/0080884 A1* | 4/2004 | Roberts et al. | 361/62 |
| 2008/0068769 A1* | 3/2008 | Ortega | 361/62 |

* cited by examiner

*Primary Examiner*—Danny Nguyen
(74) *Attorney, Agent, or Firm*—Ohlandt, Greeley, Ruggiero & Perle, L.L.P.

(57) ABSTRACT

A method of protecting a circuit having power switching devices that includes communicating a current in at least one secondary switching device to at least one master switching device and determining a presence of a fault condition within at least a first zone based at least in part upon characteristics of the current in the at least one secondary switching device communicated to the at least one master switching device to perform differential protection.

16 Claims, 9 Drawing Sheets

CIRCUIT PROTECTION SYSTEM

BACKGROUND OF THE INVENTION

1. Field of the Invention

This disclosure relates generally to power distribution systems and more particularly, to a method and apparatus for a circuit protection system providing multiple zone protective functions for zone protection throughout the system.

2. Description of the Related Art

In power distribution systems, power is distributed to various loads and is typically divided into branch circuits, which supply power to specified loads. The branch circuits can also be connected to other power distribution equipment.

Due to the concern of an abnormal power condition in the system, for example, a fault or an overload, it is known to provide circuit protective devices or power switching devices, e.g., circuit breakers, to protect the circuit. The circuit breakers seek to prevent or minimize damage and typically function automatically. The circuit breakers also seek to minimize the extent and duration of electrical service interruption in the event of a fault.

A power distribution system includes different distribution levels. Power flow of each of the levels is controlled through a circuit breaker. In case of a fault, or overload, the circuit breaker nearest to the fault needs to be tripped as quickly as possible to disrupt power flow and avoid damage to the power distribution system. To ensure that only the required part of the system is disconnected, an upstream circuit breaker must be restrained from tripping for a finite time delay (or delay via an inverse time-current relationship) to enable a downstream circuit breaker to clear the fault. This introduces a time delay in the upstream circuit breaker trip time in case of a fault downstream resulting in a undesirably high let-through energy. Let-through occurs if an upstream breaker should have tripped, but the upstream breaker is configured to wait the time period to allow the downstream breakers to trip, the flow that continues during the time period is let-through.

Design of the power distribution system must establish trip settings for different breakers individually, so that the breakers are coordinated to have a trip time curve that delays trip time in an upstream direction of the distribution levels of the power distribution system or cascaded settings. FIG. 1 shows a schematic illustration of an examplary prior art power distribution system 10. Prior art power distribution system 10 includes a plurality of circuit breakers 12. One branch 17 of prior art power distribution system 10 includes a plurality of levels 14. The plurality of distribution levels include a first level 16 having circuit breakers included in a distribution board, a second level 18 having circuit breakers included in a sub-distribution switchboard, a third level 20 having circuit breakers included in a power distribution switchboard, and a fourth level 22 having circuit breakers included in a main switchboard. The circuit breakers of first level 16 are connected downstream of second level 18, the circuit breakers second level 18 are connected downstream of third level 20, and the circuit breakers third level 20 are connected downstream of fourth level 22 relative to power flow. For example, first level 16 includes 20-ampere circuit breakers, second level 18 includes a 100-ampere circuit breaker, third level includes a 400-ampere circuit breaker downstream of a 1200-ampere circuit breaker, and fourth level includes a 4000-ampere circuit breaker.

Such a contemporary system as prior art power distribution system 10 fails to clear a fault such that a fault continues to flow through the system until it passes through a breaker that is sensitive enough to detect the fault. Thus, as shown in FIG. 2, a larger upstream overcurrent device or circuit breaker 30 must be less sensitive and slower than a smaller downstream device or circuit breaker 32. Each of upstream circuit breaker 30 and downstream circuit breaker 32 are connected to an electronic trip device 31, 33 to provide overcurrent protection functions that provides logic and information processing to make trip decisions. FIG. 2 shows a fault current present in upstream circuit breaker 30 and downstream circuit breaker 32 on a log plot over a period of time from committing to trip to clearing the fault current. As shown by curve B1, upstream circuit breaker 30 does not trip until after a time period to allow time for downstream circuit breaker 32 to trip, shown on axis A1, during flow of the fault current, as shown by arrow F1. Sensitivity and speed must be undesirably dictated by coordination requirements, such as, the time delay between upstream breaker 30 and downstream breaker 32, rather than protection or safety requirements in a cascaded power distribution system. This increases the risk of damage to the system, such as failure to timely clear a fault, increasing let-through. As settings get bigger and the breakers get slower a time delay to detect flow and determine if the flow is too much increases while a breaker waits for a breaker downstream to trip. Minimizing the let-through is extremely desirable because let-through of a fault is dangerous and causes failure/melting of expensive components of a power distribution system.

Prior art zone selective interlocking (ZSI) systems only provide (yes/no) communication between two overcurrent devices in series. A bottom (load side) device or downstream circuit breaker 232 communicates to an upper (line side) device or upstream circuit breaker 230 whether it is reacting to a fault or not. When upstream circuit breaker 230 does not receive a signal that downstream circuit breaker 232 detects a fault it knows to accelerate itself to faster operation. Thus, as shown in FIG. 4, communication between a master or upstream circuit breaker 230 and a secondary or downstream circuit breaker 232, as shown by arrow Z, improves a time period, shown on an axis Time, between upstream circuit breaker 230, as shown by curve A1, and downstream circuit breaker 232, as shown by curve B1, interrupting power flow over larger upstream overcurrent device or circuit breaker 30 and smaller downstream device or circuit breaker 32 of prior art distribution system 10, as shown in FIG. 2, in a fault condition. Each of upstream circuit breaker 230 and downstream circuit breaker 232 has an electronic trip device 231, 233 to provide overcurrent protection functions that provides logic and information processing to make trip decisions. ZSI systems undesirably only allow improvement of delays between upstream circuit breakers and downstream circuit breakers as long as a fault is high enough to be over a predetermined pick up threshold and fails to increase sensitivity of upstream circuit breakers, such as upstream circuit breaker 230, due to tolerance and load sustaining needs over prior art system 10.

If the breakers have increased sensitivity, then the breakers may trip for faults that are another breaker's responsibility. Thus, there is a problem with protection versus coordination. Each breaker of system 10 makes independent decisions. This also decreases the efficiency of the system, such as through untimely opening of circuit breakers and nuisance tripping, and can increase the extent and duration of electrical service interruption in the event of a fault.

Accordingly, there is a need for circuit protection systems incorporated into power distribution systems that decrease the risk of damage and increase efficiency of the power distribution system. There is a further need for circuit protection systems that improve delays between upstream circuit breakers and downstream circuit breakers and increases sensitivity of upstream circuit breakers over the prior art.

SUMMARY OF THE INVENTION

A method of protecting a circuit having power switching devices that includes communicating a current in at least one conterminous switching device to at least one master switching device and determining a presence of a fault condition within at least a first zone based at least in part upon characteristics of the current in the at least one conterminous switching device communicated to the at least one master switching device to perform differential protection.

A method for a protection system for a circuit having power switching devices that includes defining a plurality of zones, each of the plurality of zones having at least one master switching device and at least one secondary switching device, the at least one secondary switching device communicates with the at least one master switching device within each of the plurality of zones, communicating a current in the at least one secondary switching device to the at least one master switching device in each of the plurality of zones, and determining a presence of a fault condition by the at least one master switching device within each of the plurality of zones to perform differential protection.

The method may further comprise summing multiple input and output currents to find a fault within the first zone via bus differential calculation. The determining may comprise performing calculations based on the master power-switching device current information and information communicated thereto by the conterminous power switching device in the first zone to determine the presence of a fault within the first. The first zone may have incoming and outgoing currents. If the first zone is not faulted an instantaneous vector sum of all the currents may equal zero plus a predetermined measurement error, and if the sum exceeds zero by more than the predetermined measurement error then there may be an unaccounted current within the first zone which is classified as a fault. The method may further comprise interrupting power flow in the circuit by the at least one master switching device. The at least one master switching device may interrupt power flow after a time period. The method may further comprise adjusting the time period. The adjusting may comprise adjusting the at least one master power switching device to a slower setting than the at least one conterminous power switching device in the presence of the fault condition and adjusting the at least one master power switching device to a setting equal to the at least one conterminous power switching device in the absence of the fault condition. The method may further comprise detecting a current flow. The method may further comprise a second zone that has at least a second master switching device and at least a second conterminous switching device, and that the at least one conterminous switching device may be the second master switching device.

The method may further comprise summing multiple input and output currents in each of the plurality of zones to find a fault within the each of the plurality of zones via bus differential calculation. The determining may comprise performing calculations based on the one master switching device current information and information communicated thereto by the secondary switching device in each of the plurality of zones to determine the presence of a fault within the first. The plurality of zones may each have incoming and outgoing currents. If each of the plurality of zones are not faulted an instantaneous vector sum of all the currents may equal zero plus a predetermined measurement error, and if the sum exceeds zero by more than the predetermined measurement error then there may be an unaccounted current within each of the plurality of zones which is classified as a fault. The method may further comprise interrupting power flow in the circuit by the at least one master switching device. The at least one master switching device may interrupt power flow after a time period. The method may further comprise adjusting the time period. The adjusting may comprise adjusting the at least one master switching device to a slower setting than the at least one secondary switching device in the presence of the fault condition and adjusting the at least one master switching device to a setting equal to the at least one secondary switching device in the absence of the fault condition. The method may further comprise detecting a current flow. The at least one secondary switching device of one of the plurality of the zones may be a master switching device of another zone of the plurality of the zones.

The above-described and other features and advantages of the present disclosure will be appreciated and understood by those skilled in the art from the following detailed description, drawings, and appended claims.

DETAILED DESCRIPTION OF THE INVENTION

Figure 4:
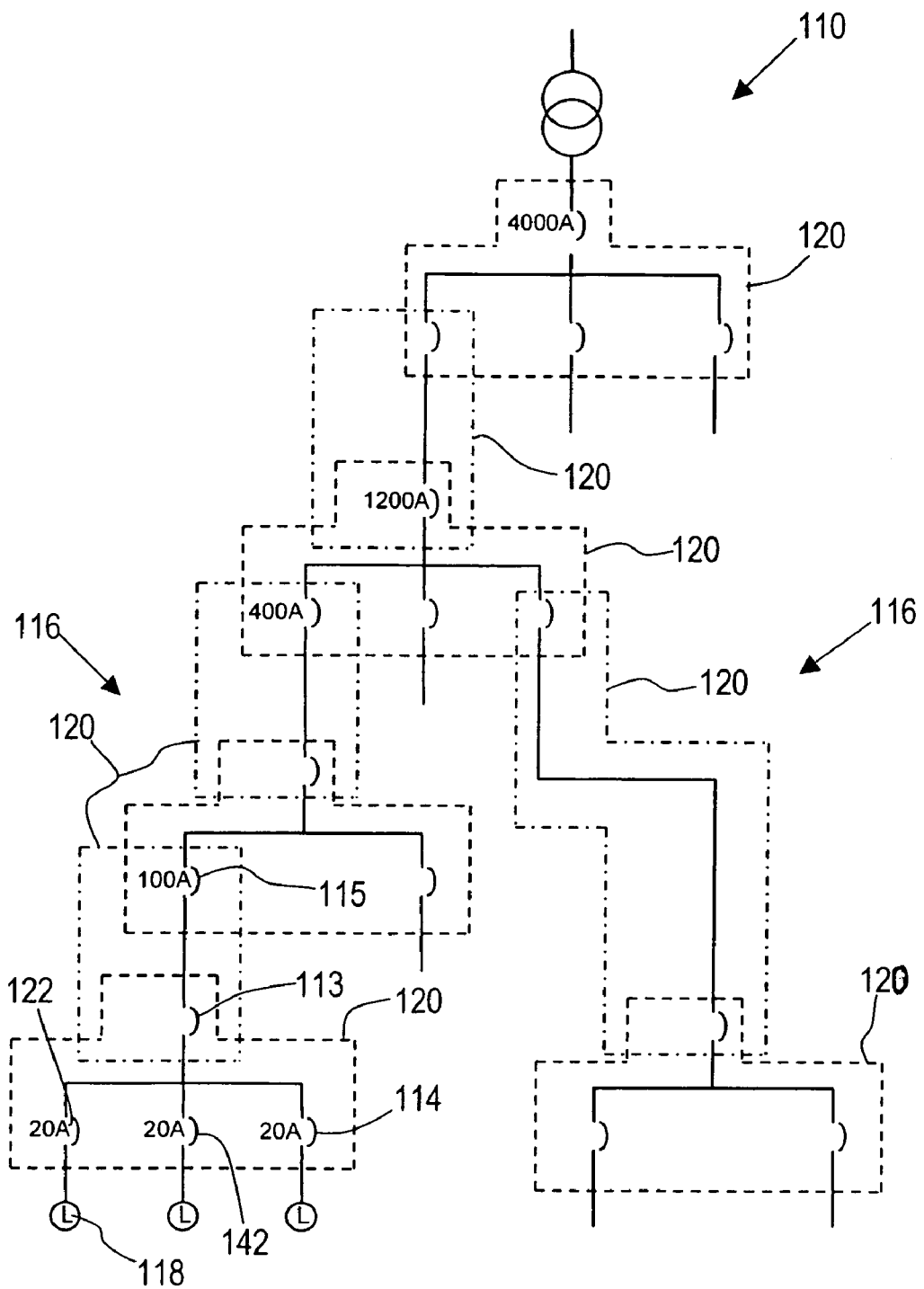
FIG. 4 is a schematic of an examplary embodiment of a zone processing system for a power distribution system.

Referring now to the drawings and in particular to FIG. 4, an examplary embodiment of a zone power distribution system (hereinafter "system") generally referred to by reference numeral 110 is illustrated. System 110 distributes power through a number or plurality of power switching devices or circuit breakers 114 to branch circuits 116 to one or more loads 118. Each of circuit breakers 114 has a sensing device and a communicating device. Circuit breakers 114 may additionally include a processor. Circuit breakers, such as, for example, branch circuit breakers 122 that do not have any circuit breakers downstream relative to power flow, may not have the processing device.

Circuit breakers 114 may include source overcurrent protection devices or circuit breakers 140 and branch overcurrent protection devices or circuit breakers 142, as shown in FIG.

4a. Source overcurrent protection devices 140 are located where current is expected to come in from a source. In some cases, source overcurrent protection devices 140 can also be a load or outgoing zone as in the case of a tie overcurrent protection device 144. Branch overcurrent protection devices or circuit breakers 142 are the last devices that feed an end use load 156 and have no further distribution thereunder.

Figure 4A:
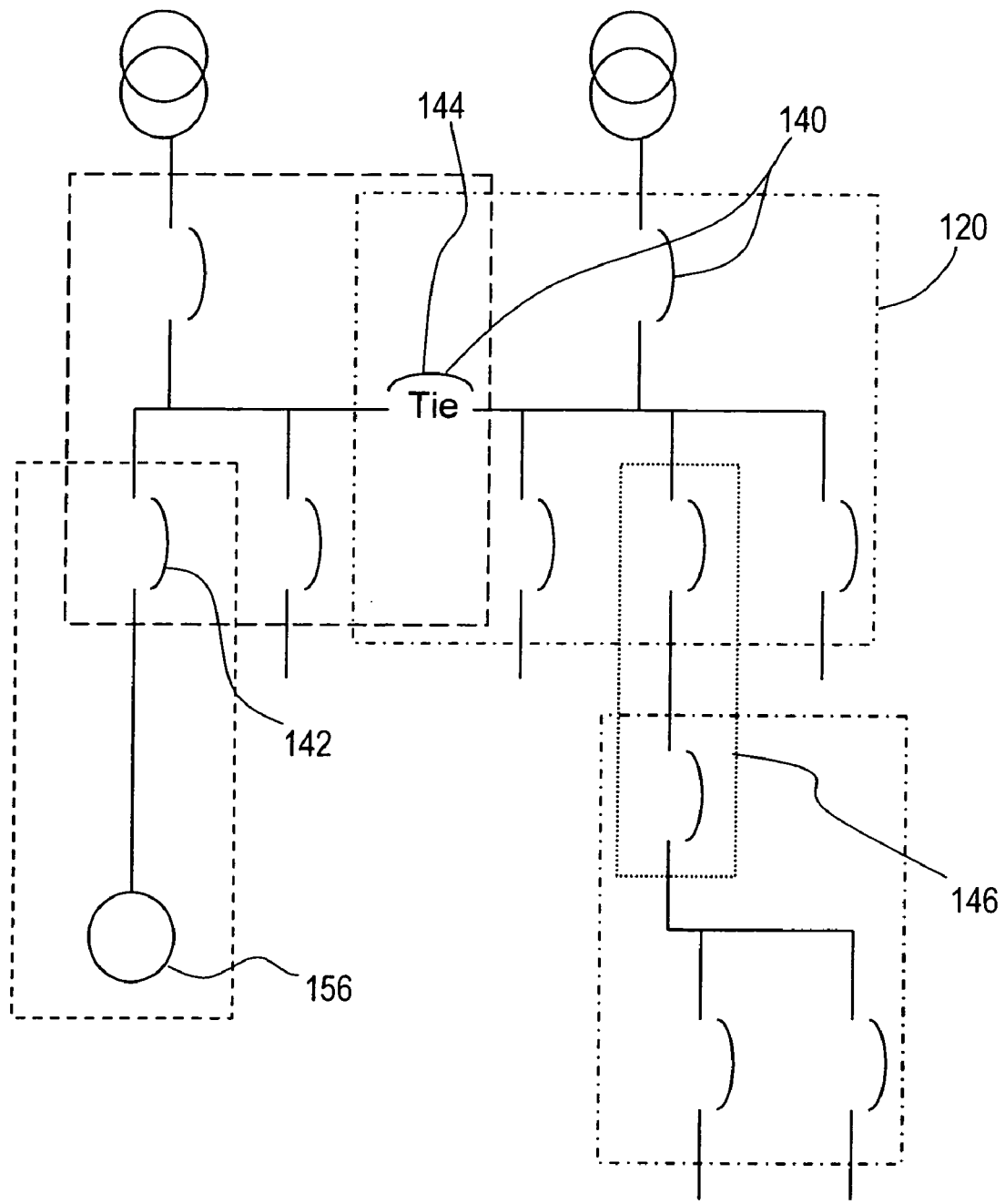
FIG. 4a is a schematic of power switching devices of the examplary embodiment of the zone processing system.

System 110 is a zone controlled and fully integrated protection, monitoring, and control system. One or more zones 120 are bounded by source and load automatic over current protective devices or circuit breakers 114. Zones 120 may overlap via tie circuits breakers 144 and outgoing feeder or a source zone to a main of a load zone, such as, for example, overlapping zone 146, as shown in FIG. 4a. System 110 is configured so that each of circuit breakers 114 acts as a master breaker, such as, for example, one of master circuit breakers in System 110 is a master breaker 115, for breakers connected directly below or downstream of the master breaker and a secondary breaker, such as, for example, one of secondary circuit breakers in System 110 is a secondary breaker 113, to circuit breakers immediately above or upstream of the master breaker. A secondary breaker is below or downstream of a master breaker. A master breaker is above or upstream of a secondary breaker. Each of circuit breakers 114 may sense currents and/or voltages via the sensing device. Each of circuit breakers 114 may communicate via the communicating device the sensed currents and/or voltages to master breakers.

Figure 5:
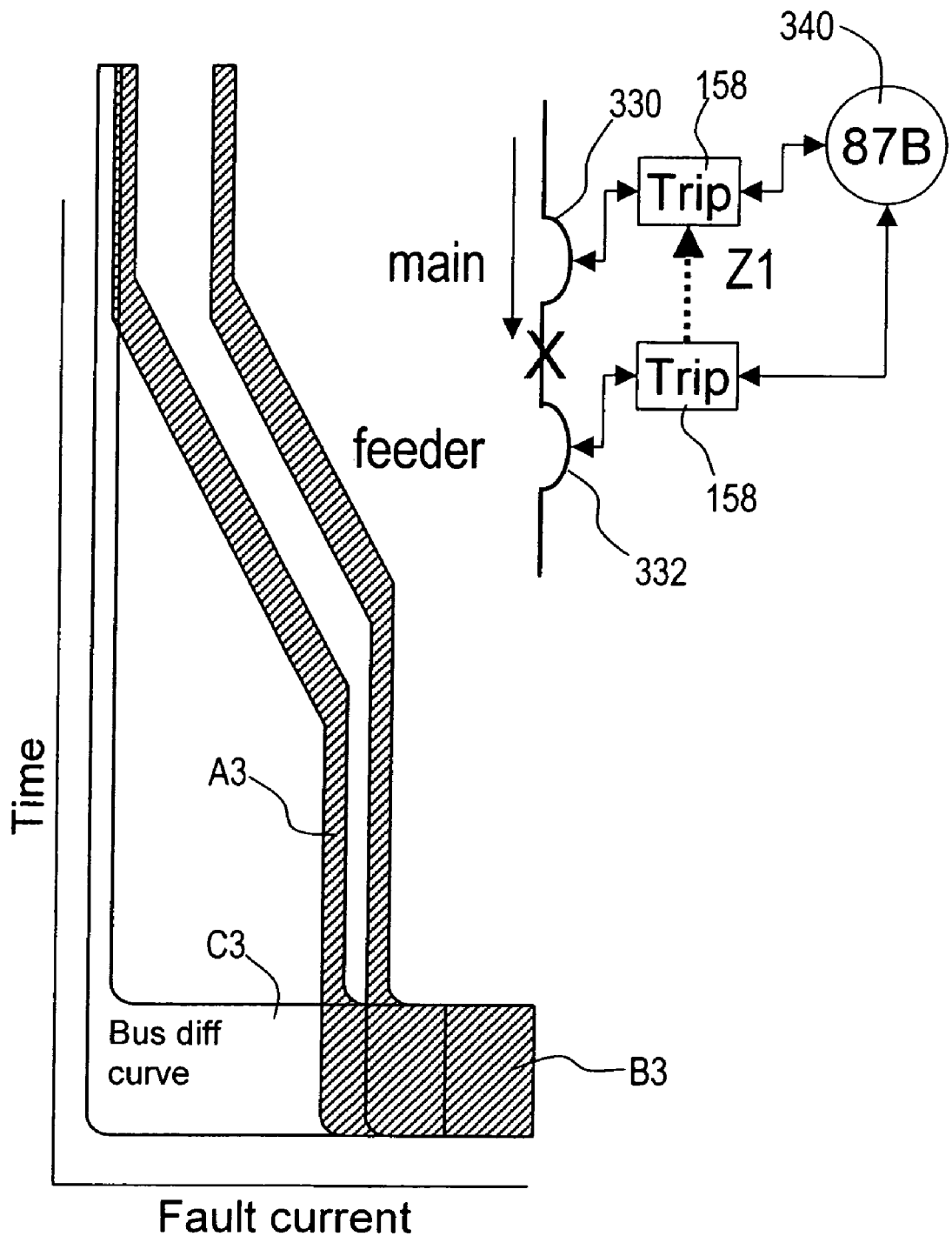
FIG. 5 is a graphical depiction of a fault current over time in the examplary embodiment of the zone processing system including bus differential protection.

Master breakers use information communicated by secondary or conterminous circuit breakers, as illustrated by arrow Z1 in FIG. 5, to perform differential protection for one of zones 120 via a processor 158. Differential protection is based on Kirchoff's current law that states that all the current into a junction or node must equal all the current out of the node. A master circuit breaker performs calculations based on its own current information and information communicated thereto by secondary breakers in a master circuit breaker's zone. Based upon the result of the calculations, a master breaker determines the presence of an excessive current or fault within the master circuit breaker's zone or is passing through to a lower zone. Zones 120 have incoming and outgoing currents. If one of zones 120 is not faulted the instantaneous vector sum of all the currents should equal zero plus a predetermined measurement error. If the sum exceeds zero by more than the predetermined measurement error then there is an unaccounted current within the zone which is classified as a fault. For the master breaker to make the calculation it must have synchronized instantaneous values from each entrance and exit in the master circuit breaker's zone, or synchronized phasor values for each input/output (I/O) point. Each secondary circuit breaker must measure and communicate measurements to a master breaker. Each master breaker receives the measurements and processes for its assigned zone. Sensitivity and speed of this decision is based on the sensing and computational limits of the hardware, not selectivity constraints imposed by speed or delays of circuit breakers 114.

Figure 1:
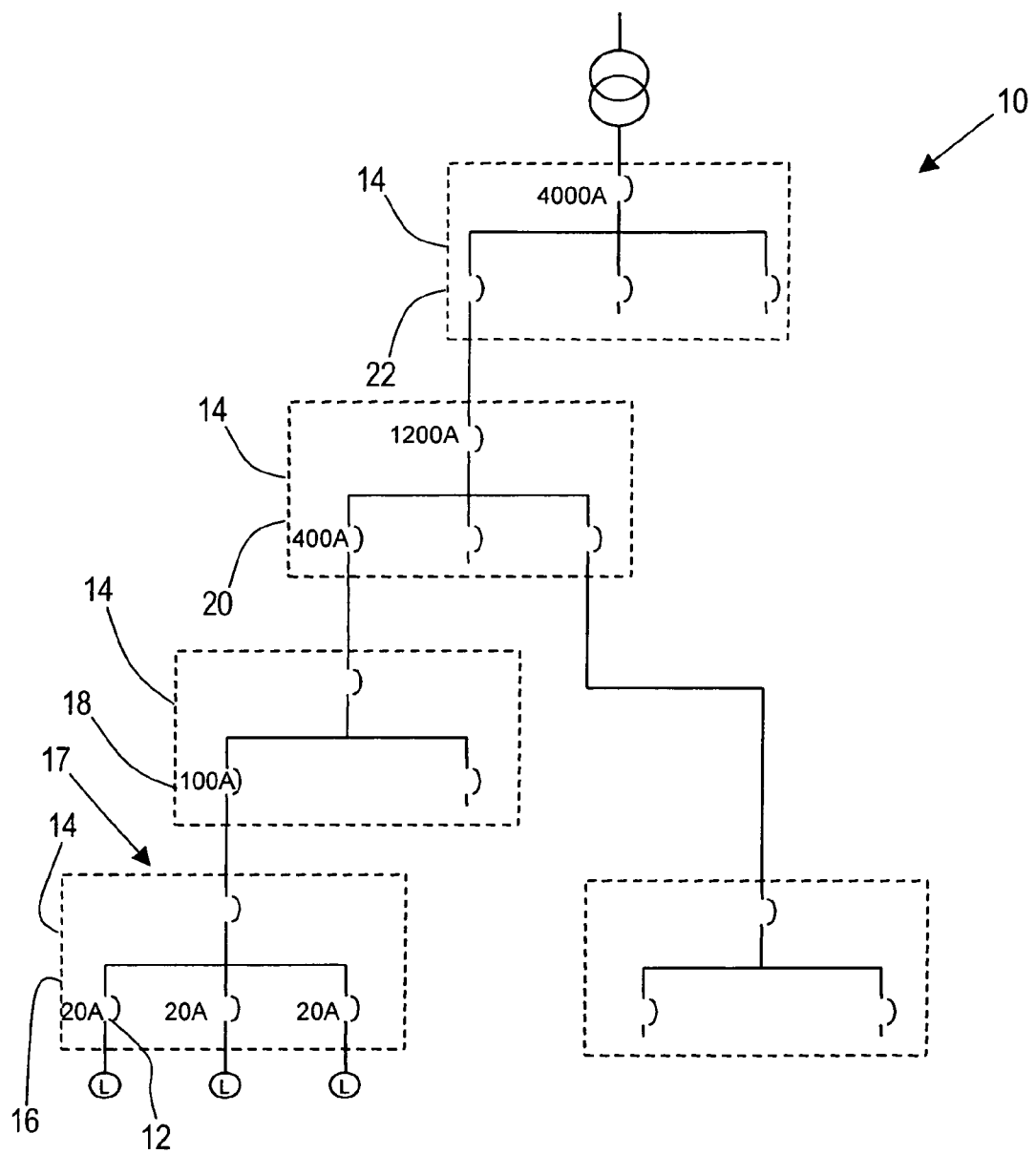
FIG. 1 is a schematic illustration of an examplary prior art power distribution system.
Figure 2:
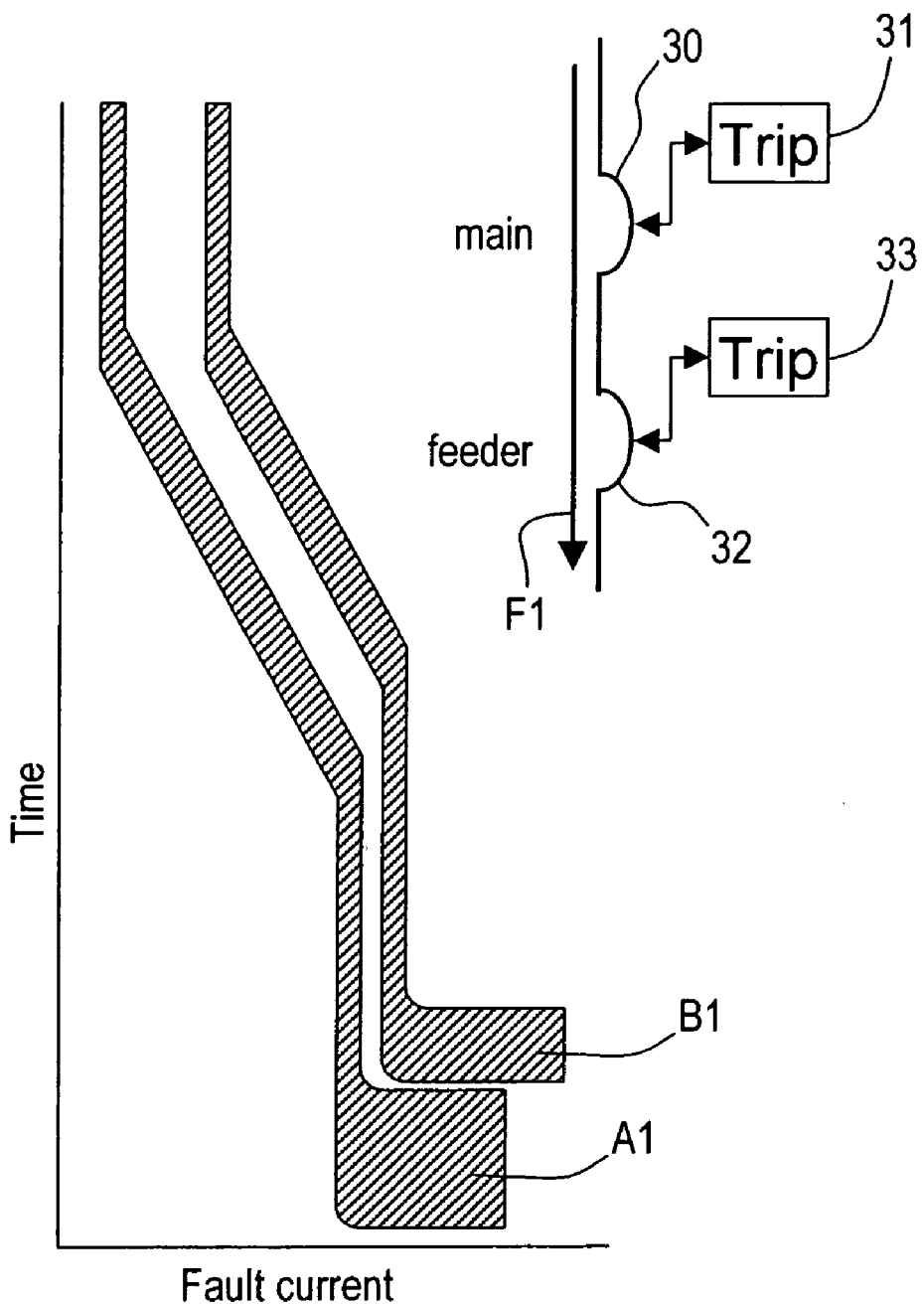
FIG. 2 is a graphical depiction of a fault current over time in the examplary prior art power distribution system.
Figure 3:
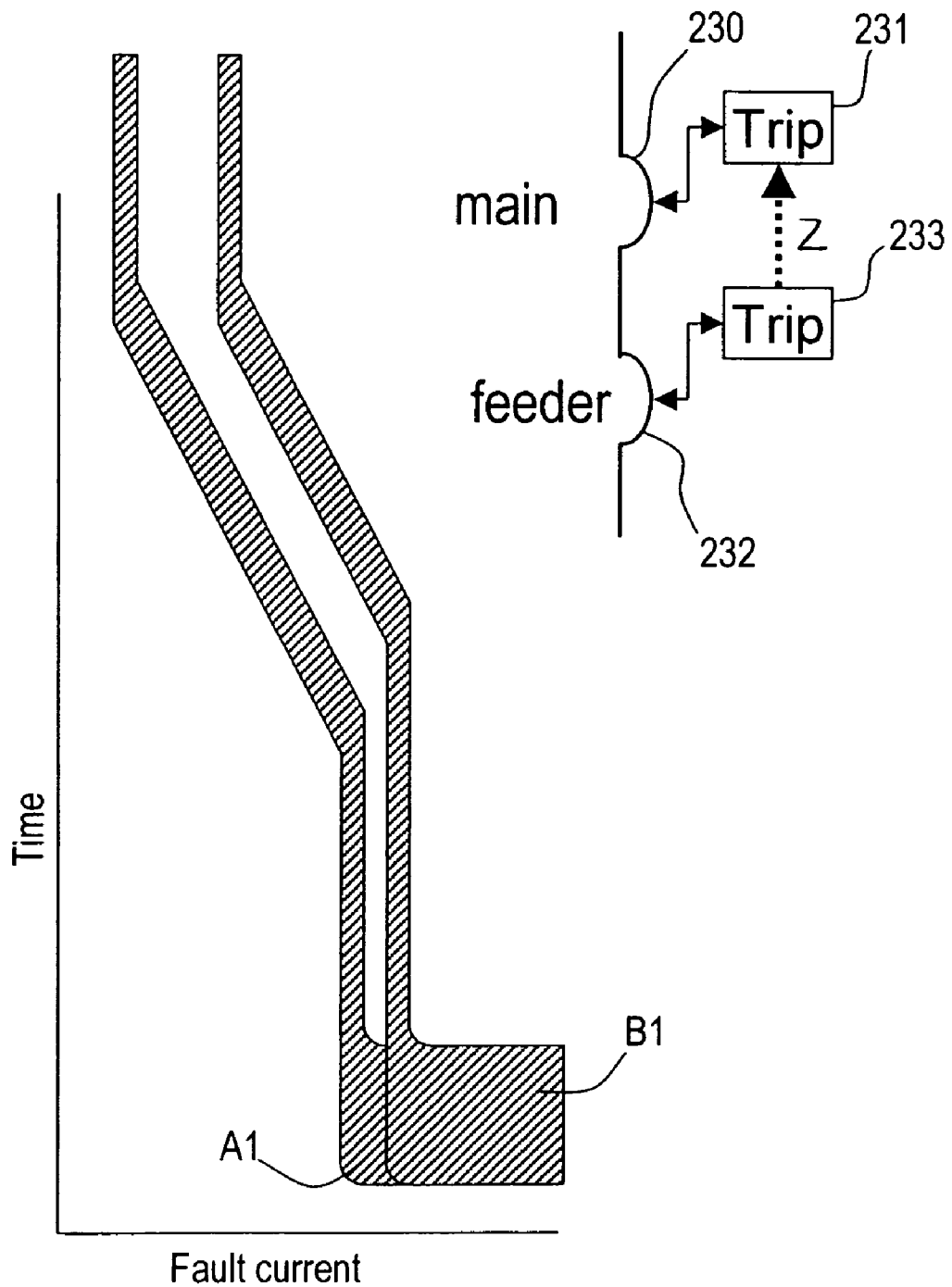
FIG. 3 is a graphical depiction of a fault current over time in a prior art zone selective interlocking power distribution system.

The processor of the master breaker may include an algorithm to adjust a time period to any time period between the master breaker and the secondary circuit breakers to interrupt power flow, based on the conditions detected by the master and secondary circuit breakers and the calculations based on its own current information and information communicated thereto by secondary breakers in a master circuit breaker's zone. The master breaker operates at a faster setting that may be equal to the secondary circuit breakers' time setting when the secondary circuit breakers indicate the absence of a fault condition. Thus, as shown in FIG. 5, communication between a master or upstream circuit breaker 330 and a secondary or downstream circuit breaker 332, as shown by arrow Z1, and the calculation by master circuit breaker 330 improves a time period, shown on an axis Time, between upstream circuit breaker 330, as shown by curve A3, and downstream circuit breaker 332, as shown by curve B3, interrupting power flow over larger upstream overcurrent device or circuit breaker 30 and smaller downstream device or circuit breaker 32 of prior art distribution system 10, as shown in FIG. 2, in a fault condition.

The user or architect must define at least one master circuit breaker for each of one or more zones 120. The master circuit breaker may be between the zone and the source and not a circuit breaker between the zone and a load. If a zone consists of one circuit breaker and a load then the one of circuit breaker is its own master for that zone comprised only of itself.

As shown in FIG. 5, sensitivity in system 110 may be improved by an addition of a master breaker that includes bus differential 87B function. The bus differential sums multiple input and output currents to find a fault within the zone. The processing device or logic 340 for bus differential calculation (87B) or function uses synchronized phasor values for all incoming and out going currents so a sum total node current can be calculated. The bus differential may be made sensitive to smaller faults, even less than the full load current of the circuit, only as limited by the accuracy of the sensing mechanism but not limited by coordination requirements, but may, in some cases not be useful for higher fault values due to current transformer saturation. However, the combination of the bus differential function into system 110 provides capability to detect a complete range of potential fault values as limited by the interrupting rating of the circuit breaker, such as, for example, in some cases as high as 200,000 amperes and further may encompass zero sequence (ground fault) faults in addition to the phase protection, ensuring selectivity between ground faults and phase protection. Thus, as shown in FIG. 5, processing device or logic 340 for bus differential calculation (87B) or function increases sensitivity, as shown by curve C3, over larger upstream overcurrent device or circuit breaker 30 and smaller downstream device or circuit breaker 32 of prior art distribution system 10, as shown in FIG. 2, in a fault condition.

Figure 6:
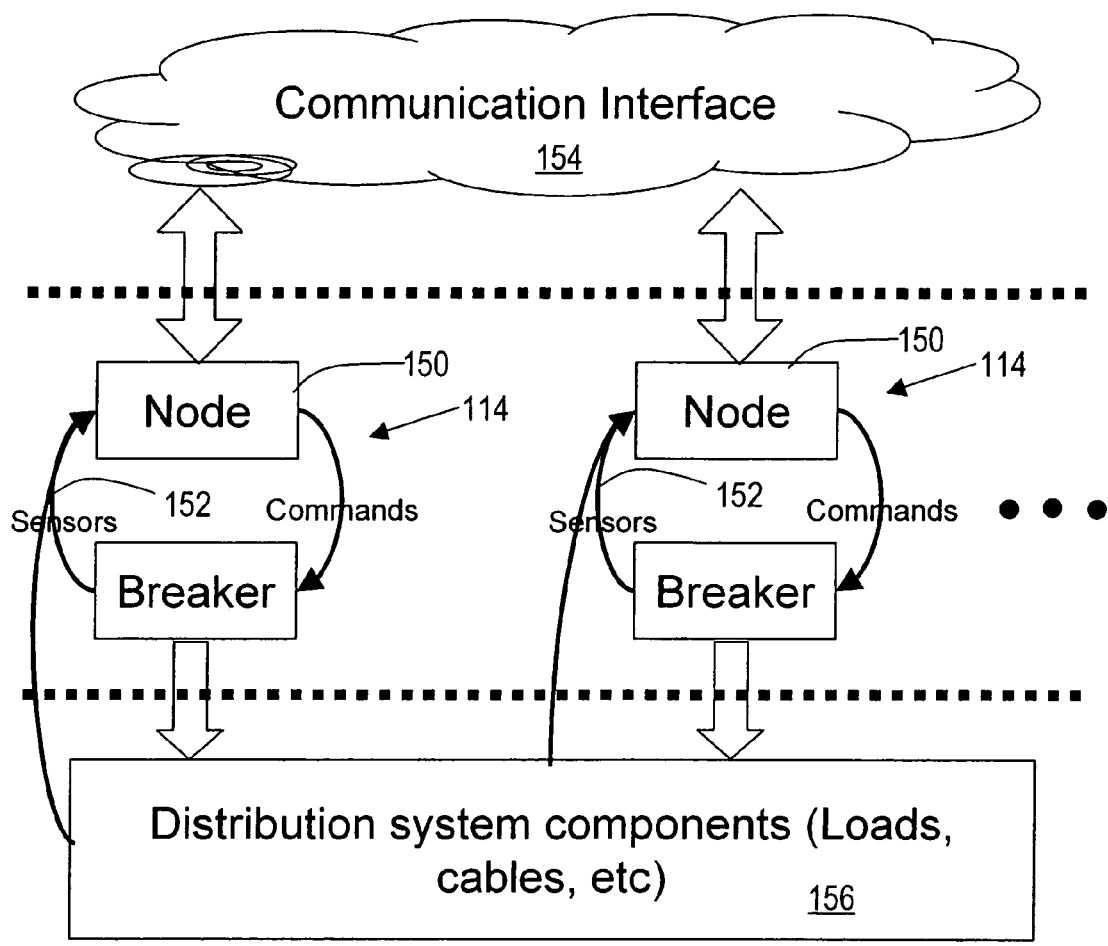
FIG. 6 is a schematic of an examplary embodiment of power-switching devices in the zone processing system.

As shown in FIG. 6, the communicating device may be, such as, for example, one or more nodes 150. Sensor 152 may be any sensor that detects current flow. Sensors may be integral with the breaker or mounted externally of the breaker. Sensor 152 may provide an analog information signal proportional to current magnitude. The analog information signal is sent to node 150 which digitizes and packetizes the analog information signal for communication purposes and sends it to a communication interface 154 which then communicates the information to a master breaker. The communication interface 154 receives multiple pieces of information from multiple points in circuit breakers 114 and may package the information. A hierarchy of circuit breakers 114 may be established automatically via the processor by logic, manual interface, architecture, or any combination thereof. Communication interface 154 may include power line carrier communication, a wireless communication interface similar to a mobile telephone network, or any other communication interface.

Each of circuit breakers 114 that directly connected to a load, branch circuit breaker 142, does not require a processor or information from other circuit breakers however it does have a need to communicate to a master breaker above. Hardware for that capability is needed. Distribution system components 156, as shown in FIG. 6, may be loads, cables, any distribution system component, or any combination thereof. In the case that there are more than one of circuit breakers 114 that include processors, each processor has an algorithm to be executed locally for secondary breakers.

Figure 7:
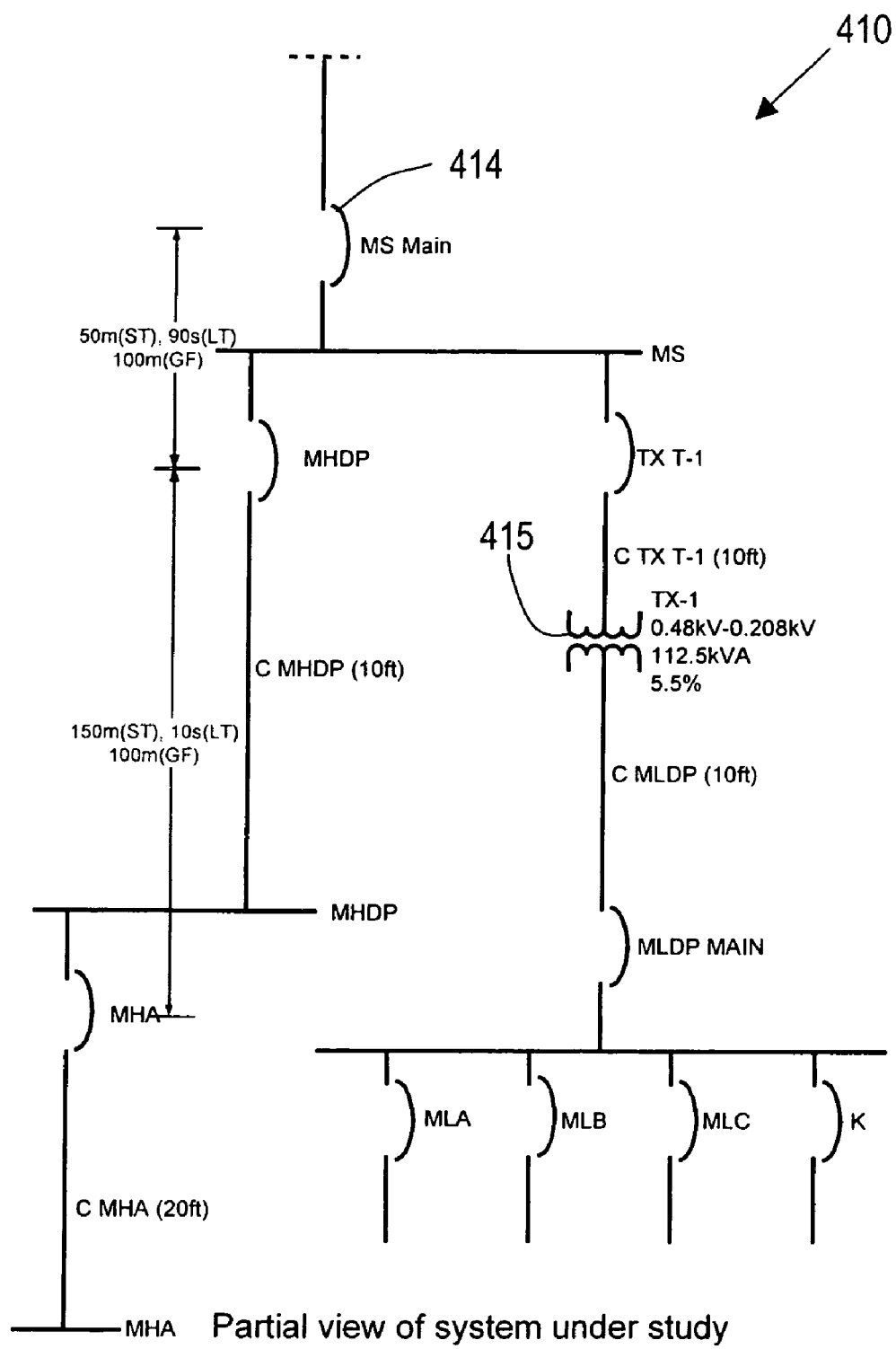
FIG. 7 is a partial schematic of an examplary embodiment of a case study including a zone processing system.
Figure 8:
FIG. 8 is a graphical depiction of a comparison of let-through of the examplary embodiment of a zone processing system and the examplary prior art power distribution system of a first power switching device.
Figure 8:
Figure 8:
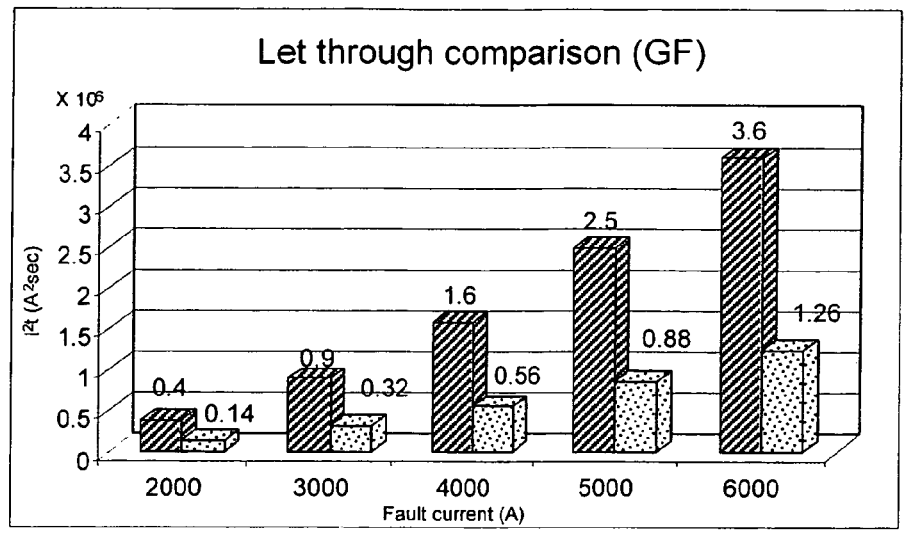
Figure 9:
FIG. 9 is a graphical depiction of a comparison of let-through of the examplary embodiment of a zone processing system and the examplary prior art power distribution system of the first power switching device.
Figure 9:
Figure 9:
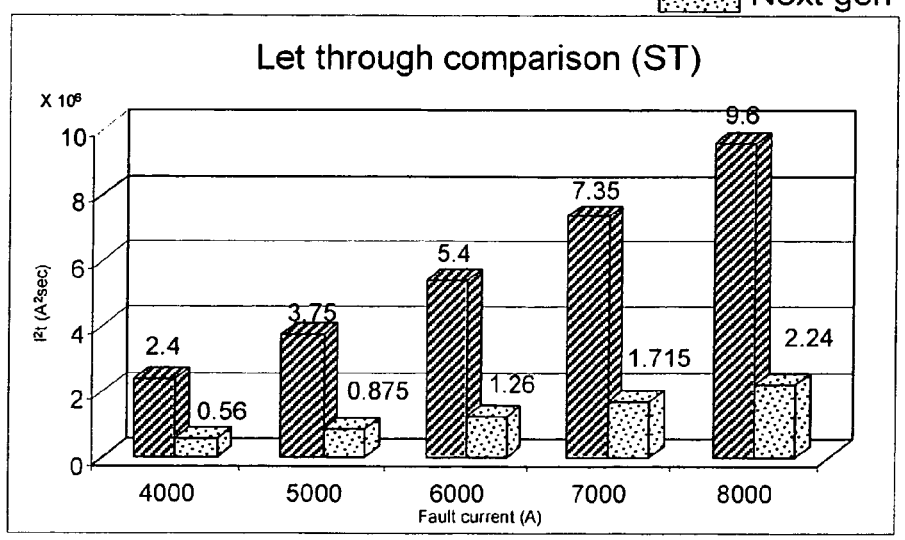

A case study was performed on a model distribution system 410, as shown in FIG. 7. Model distribution system 410 included a plurality of circuit breakers 414 and a transformer 415. Let-through characteristics of a MS main circuit breaker MS Main of model distribution system 410 were analyzed based on prior art cascaded control methodology for circuit breakers and compared to a zone distribution system as described herein optimized for selectivity and protection limited only by inherent capabilities, for example, sensing technology and memory. Comparison based on amperes squared times second, which is a mathematical value proportional to energy, for two kinds of fault scenarios: ground faults and face faults are shown in FIGS. 8 and 9. As shown in FIGS. 8 and 9, a zone power distribution system as described herein may reduce let-through by 60%-75% over prior art cascaded control and zone selective interlocking methodology.

While the instant disclosure has been described with reference to one or more examplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A method of protecting a circuit having power switching devices, the method comprising:
    communicating a current in at least one conterminous switching device to at least one master switching device;
    determining a presence of a fault condition within at least a first zone based at least in part upon characteristics of said current in said at least one conterminous switching device communicated to said at least one master switching device to perform differential protection, said at least one master switching device interrupts power flow after a time period; and
    adjusting said time period,
    wherein said adjusting comprises adjusting said at least one master power switching device to a slower setting than said at least one conterminous power switching device in said presence of said fault condition and adjusting said at least one master power switching device to a setting equal to said at least one conterminous power switching device in said absence of said fault condition.

2. The method of claim 1, further comprising summing multiple input and output currents to find a fault within said first zone via bus differential calculation.

3. The method of claim 2, wherein said determining comprises performing calculations based on said at least one master power-switching device current information and information communicated thereto by said at least one conterminous power switching device in said first zone to determine the presence of a fault within said first zone.

4. The method of claim 3, wherein said first zone has incoming and outgoing currents, wherein if said first zone is not faulted an instantaneous vector sum of all the currents equals zero plus a predetermined measurement error, and wherein if said sum exceeds zero by more than said predetermined measurement error then there is an unaccounted current within said first zone which is classified as a fault.

5. The method of claim 1, further comprising interrupting power flow in the circuit by said at least one master switching device.

6. The method of claim 1, further comprising detecting a current flow.

7. The method of claim 6, further comprising a second zone that has at least a second master switching device and at least a second conterminous switching device, and wherein said at least one conterminous switching device is said second master switching device.

8. A method for a protection system for a circuit having power switching devices, the system comprising:
    defining a plurality of zones, each of said plurality of zones having at least one master switching device and at least one secondary switching device, said at least one secondary switching device communicates with said at least one master switching device within each of said plurality of zones;
    communicating a current in said at least one secondary switching device to said at least one master switching device in each of said plurality of zones;
    determining a presence of a fault condition by said at least one master switching device within each of said plurality of zones to perform differential protection, said at least one master switching device interrupting power flow after a time period; and
    adjusting said time period,
    wherein said adjusting comprises adjusting said at least one master switching device to a slower setting than said at least one secondary switching device in said presence of said fault condition and adjusting said at least one master switching device to a setting equal to said at least one secondary switching device in said absence of said fault condition.

9. The method of claim 8, further comprising summing multiple input and output currents in each of said plurality of zones to find a fault within said each of said plurality of zones via bus differential calculation.

10. The method of claim 8, wherein said determining comprises performing calculations based on said one master switching device current information and information communicated thereto by said secondary switching device in each of said plurality of zones to determine the presence of a fault within said first.

11. The method of claim 10, wherein said plurality of zones each have incoming and outgoing currents, wherein if each of said plurality of zones are not faulted an instantaneous vector sum of all the currents equals zero plus a predetermined measurement error, and wherein if said sum exceeds zero by more than said predetermined measurement error then there is an unaccounted current within each of said plurality of zones which is classified as a fault.

12. The method of claim 8, further comprising interrupting power flow in the circuit by said at least one master switching device.

13. The method of claim 8, further comprising detecting a current flow.

14. The method of claim 13, wherein said at least one secondary switching device of one of said plurality of said zones is a master switching device of another zone of said plurality of said zones.

15. A method for a protection system for a circuit having power switching devices, the system comprising:
    providing a first power switching device connected to a second power switching device in a first zone, said first power switching device being connected to a third power switching device in a second zone, said second zone being lower than said first zone, said first switching device communicating a current in said first switching device to said second switching device in said first zone and said first switching device receiving a current in said third switching device in said second zone, wherein said second switching device performs calculations based on its own current information and information communicated thereto by said first switching device and based upon a result of said calculations, said first switching device determining a presence of a fault within said first zone or a fault passing through to said second zone.

16. The method of claim 15, wherein said second switching device adjusts a time period between said second switching device and said first switching device to interrupt power flow based said calculations.

* * * * *